UNITED STATES PATENT OFFICE.

JOHN H. ROSS AND CHARLES D. ROSS, OF ALBION, NEW YORK.

IMPROVEMENT IN PROCESSES OF PREPARING GLUE.

Specification forming part of Letters Patent No. 183,024, dated October 10, 1876; application filed August 11, 1873.

*To all whom it may concern:*

Be it known that we, JOHN H. ROSS and CHARLES D. ROSS, both of Albion, in the county of Orleans and State of New York, have invented a certain Glue, to be used in the place of glue or cement as now manufactured, of which the following is a specification:

The invention relates to that class of compounds used to cement and fasten various articles together; and it consists in a composition formed by treating the curd of sour milk in a peculiar manner with alkalies or lime-water, or both.

To prepare the glue, we take sour milk and boil it slowly for some fifteen or twenty minutes. We then décant the whey while it is hot. This removes the oil or fatty matter, and leaves the pure sour curd, which is then dried. We now cut it with soda, potash, or any other alkali and add lime-water, and subject the whole to slow boiling until all the water is driven off; the residue resembles a fine article of white glue, both in its properties and appearance, being hard, tough, and translucent, and capable of uniting various solid substances with great tenacity.

It is thought that the best proportion for the articles used is seven parts of curd, one of strong alkaline solution, and one of lime-water. However, this proportion may be varied without materially changing the result.

If it is desired to put the cement up in the form of mucilage, either the alkali or lime-water may be used to cut the curd, or both may be used.

It is an essential step in the process of making this glue that the oily and fatty matters should be removed from the curd before the alkali is added, otherwise saponification will ensue to a greater or less extent when the alkali is added. For this purpose, after the milk is boiled, the whey is decanted while hot, as before described. By this means the oil, which rises to the top by the boiling, is turned off until the material is practically freed of the same. This is a matter of vital importance, for the saponification of the glue would seriously affect its adhesive qualities.

We are aware that a cement has before been formed of curdled skim-milk, having the whey pressed out, and mixed with quick-lime. Such we do not claim.

What we claim as new is—

The process herein described of preparing glue, which consists, first, in boiling and decanting sour milk to remove the oily matter, then drying and cutting the curd by alkali, and adding lime-water, and, finally, boiling the product till the watery matter is expelled, as and for the purpose specified.

JOHN H. ROSS.
CHARLES D. ROSS.

Witnesses:

L. R. SANDFORD,
JOHN CUNNUN.